United States Patent Office 3,165,653
Patented Jan. 12, 1965

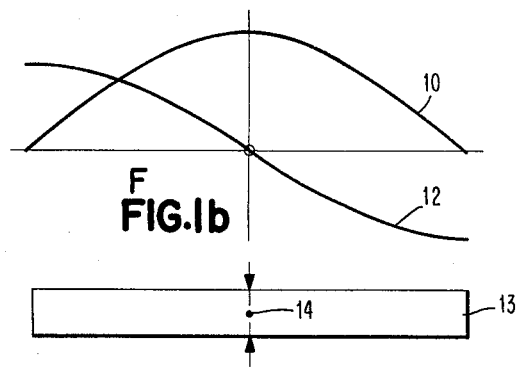
FIG. 1b
FIG. 1a
FIG. 2
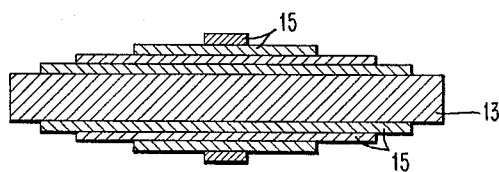
FIG. 3
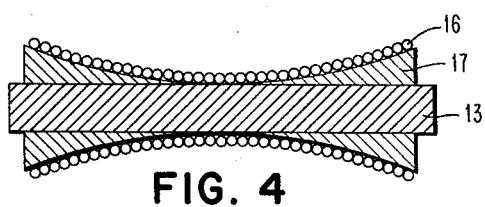
FIG. 4
INVENTOR
MAX PREISINGER
BY John S. Gasper
ATTORNEY

3,165,653
MAGNETOSTRICTIVE RESONATOR DEVICE WITH SINUSOIDALLY VARYING EXCITING FIELD
Max Preisinger, Darmsheim, near Boblingen, Wurttemberg, Germany, assignor to International Business Machines Corporation, New York, N.Y., a corporation of New York
Filed Mar. 14, 1962, Ser. No. 179,542
Claims priority, application Germany Mar. 18, 1961
6 Claims. (Cl. 310—26)

This invention relates to electromagnetic devices and more particularly to magnetostrictive resonator devices.

Magnetostrictive resonators for converting electric energy into mechanical energy and vice versa have found a broad field of application. They are used to particular advantage in a frequency range, primarily the supersonic range, wherein other types of converters are relatively ineffective and difficult to manufacture. Among other properties they are insensitive to external influences and of a robust construction. They offer the possibility of reflecting relatively high energies to liquid and solid materials. Basically, the magnetostrictive resonator consists of a rod surrounded by a coil for its electromechanical excitation. The dimensions and the elastic properties of the magnetostrictive material determine the mechanical resonant frequencies of the rod.

In most applications, the resonator is excited with its basic frequency in the longitudinal axis with a node of vibration in the center and antinodes of vibration at the ends of the rod, as that results in the highest energy conversion. The magnetostrictive effect causes elastic strains and deformations in the rhythm of the exciting magnetic alternating field in the direction of the rod axis. Of special importance in that connection is the electromechanical coupling factor or the efficiency of the arrangement, i.e. the ratio of the mechanical vibrational energy produced in the rod to the applied electric energy.

This electromechanical coupling factor is principally determined by the properties of the magnetostrictive material employed for the rod, by the occurring hysteresis and eddy current losses, and by the produced stray flux. It is known that the coupling factor may be increased by influencing the aforementioned phenomena. That is done by producing magnetostrivtice materials having especially favorable properties, such as the ceramic magnetic materials. A further improvement of the coupling factor is obtained by biasing the core with a direct field. Particularly in resonators for higher frequencies, i.e., when using longitudinal vibrators the length of which is small as compared to their diameter, the stray flux causes unfavorable actions. Its influence may be reduced by constructing the resonator with a plurality of rods connected with each other by end plates, i.e. by forming a closed magnetic circuit.

For lower frequencies, the dimensions of a longitudinal resonator are changed, the length of the rod becoming large as compared to its diameter.

Accordingly, in such resonators, the airway for the magnetic lines of force is very long, and their excitation requires a large number of ampere turns. By this fact, the efficiency is deteriorated. Neither does the formation of a closed magnetic circuit result in a satisfactory improvement in this case. In general, the coil is so mounted on the rod that the larger part of the rod is engaged by the magnetic alternating flux produced thereby. It is well known that, if in such resonators only part of the core is to be excited, the coupling factor becomes greatest when the exciting coil is mounted at the node of vibration.

The invention now has for its object to obtain the highest possible electromechanical coupling factor or efficiency, respectively, in the simple magnetostrictive longitudinal resonators, i.e., such including a magnetic circuit closed via the airway, particularly in such resonators having a length large as compared to their diameter.

In accordance with this invention, that is achieved by distributing the exciting coil along the magnetostrictive rod in such a manner that e.g. in the half-wave resonator the greatest density of turns is at the node of vibration in the center of the rod and then decreases to both ends in accordance with a sine function, or that, with a constant density of turns, the diameter of the turns is smallest at the node of vibration and increases steadily toward the antinodes of vibration. In a quarter-wave resonator, the rod is wound in a correspondingly modified manner. In such manner optimum electromechanical coupling with a high degree of efficiency in exciting magnetostrictive longitudinal resonators is obtainable.

The foregoing and other objects, features and advantages of the invention will be apparent from the following more particular description of preferred embodiments of the invention, as illustrated in the accompanying drawings.

In the drawings:

FIG. 1a is a schematic of a longitudinal resonator.

FIG. 1b is a graph illustrating magnetostrictive vibration phenomena of the longitudinal resonator shown in FIG. 1a.

FIG. 2 is a first embodiment of a longitudinal resonator incorporating the features of the present invention.

FIG. 3 is a second embodiment of a longitudinal resonator incorporating the features of the present invention.

FIG. 4 is a third embodiment of a longitudinal resonator incorporating the features of the present invention.

Referring to the drawings, FIG. 1a represents a half-wave resonator in the form of a rod 13. It is supported in any well known manner at its node of vibration 14. The curves of FIG. 1b drawn above the rod 13 illustrates the essential magnitudes occurring in a rod vibrating at its resonant frequency in the longitudinal axis. Curve 10 represents the sinusoidal shape of the alternating pressure produced on a vibration and thus the size of the deformations along the rod 13. These values are highest at the node of vibration in the center of the rod. Curve 12 shows the corresponding progress of amplitude and speed along the rod 13. A rod excited once in its basic vibration would consume its vibrating energy during a vibration fading with attenuation. The coil 11 now has the function of periodically compensating the energy consumed in each period of the vibration by the existing attenuation with the aid of the magnetostrictive property of the resonator by an applied alternating field. The magnitude of the energy consumption caused by the attenuation is proportional to the alternating pressure and the deformation at each point of the rod as shown in curve 10 of FIG. 1b, i.e. it is also sinusoidal in shape. In magnetically biased magnetostrictive resonators a proportionality may be assumed between the intensity of the magnetic field and the deformations produced. If now at each point of the rod a magnetic alternating field intensity proportional to this energy consumption and deformation or alternating pressure, respectively, is produced, the highest possible electromechanical degree of coupling is obtained.

The required sinusoidal distribution of the magnetic field intensity along a rod having a large length as compared to its diameter may be achieved by a correspondingly sinusoidal distribution of the density of turns in the coil on the rod. FIG. 2 illustrates the longitudinal resonator with a single layer coil 11, the turns of coil 11 having a uniform diameter throughout. Sinusoidal distribution is attained by winding coil 11 on rod 13 such that a large number of turns is provided at the center or node position of rod 13. The pitch of the turns of coil 11 then is varied from the node of vibration outwardly to the antinodes.

An alternate construction for attaining the sinusoidal field distribution is shown in a second embodiment of FIG. 3. In this embodiment the energizing winding is a multilayer winding 15. The concentration of turns is again greatest at the node position i.e. the center of rod 13. The layers of coil 15, however, are of different lengths and when concentrically arranged on rod 13, presents a stepped gradation which produces the desired sinusoidal field distribution along rod 13.

In FIG. 4, another embodiment is represented for producing a sinusoidal distribution of the magnetic field intensity. In the embodiment of FIG. 4, a single layer coil 16 is used in which the turns are wound at a constant pitch. However, the diameter of the turns varies progressively from a minimum at the node position to a maximum at the antinode positions. For purposes of obtaining a winding of turns with a turn diameter which increases steadily in a sinusoidal manner from the node position, a winding body 17 is provided which is concentrically positioned on rod 13. In the center or node position, the diameter of winding body 17 is substantially the same as the diameter of rod 13. The diameter of winding body 17 increases toward the ends with a slope whereby the magnetic field of coil 16 varies in accordance with a sine function.

While the invention has been particularly shown and described with reference to preferred embodiments, thereof, it will be understood by those skilled in the art that the foregoing and other changes in form and details may be made therein without departing from the spirit and scope of the invention.

What is claimed is:

1. An electromagnetic device comprising a magnetostrictive longitudinal resonator element said resonator clamped at its node of vibration, and magnetic coupling means for electromechanically exciting said resonator element, said magnetic coupling including means to excite the resonator element longitudinally at every point proportional to the deformation stress at that point of a freely longitudinally vibrating rod.

2. An electromagnetic device in accordance with claim 1 in which said exciting means comprises a coil having a plurality of turns having a turn density greater at the node of vibration of said resonator element, said turn density decreasing in accordance with a sine function toward the antinodes of vibration.

3. An electromagnetic device in accordance with claim 2 in which said coil member comprises a single layer of turns on said resonator element and said sinusoidal distribution of the density of turns is attained by a steady change in the pitch angle of said turns in said single layer.

4. An electromagnetic device in accordance with claim 2 in which said coil members comprises multilayer exciting coils said sinusoidal distribution being attained by a stepped graduation of said layers of said coils.

5. An electromagnetic device in accordance with claim 2 in which said turns of said coil member are uniformly distributed along the longitudinal extent of said resonator element, said sinusoidal field distribution being attained by having the diameter of said turns small at the node of vibration of said resonator and increasing steadily in the direction toward the antinodes of vibration.

6. An electromagnetic device in accordance with claim 5 in which said resonator is a cylindrical rod element, and a winding element is concentrically arranged between said rod element and said coil member, said winding element being tapered with a minimum diameter located at said node of vibration and increasing steadily toward the antinodes of vibration.

References Cited in the file of this patent
UNITED STATES PATENTS
1,882,394   Pierce _____ Oct. 11, 1932